US011876225B2

(12) United States Patent
Jun et al.

(10) Patent No.: US 11,876,225 B2
(45) Date of Patent: Jan. 16, 2024

(54) SOLID-STATE LITHIUM-ION CONDUCTOR AND METHODS OF MANUFACTURE THEREOF

(71) Applicants: SAMSUNG ELECTRONICS CO., LTD., Suwon-si (KR); THE REGENTS OF THE UNIVERSITY OF CALIFORNIA, Oakland, CA (US)

(72) Inventors: KyuJung Jun, Albany, CA (US); Gerbrand Ceder, Orinda, CA (US); Yan Wang, Brookline, MA (US); Lincoln Miara, Lincoln, MA (US); Yan Zeng, Albany, CA (US); Yihan Xiao, Berkeley, CA (US)

(73) Assignees: SAMSUNG ELECTRONICS CO., LTD., Gyeonggi-Do (KR); THE REGENTS OF THE UNIVERSITY OF CALIFORNIA, Oakland, CA (US); LAWRENCE BERKELEY NATIONAL LABORATORY, Berkeley, CA (US)

(*) Notice: Subject to any disclaimer, the term of this patent is extended or adjusted under 35 U.S.C. 154(b) by 222 days.

(21) Appl. No.: 17/322,325

(22) Filed: May 17, 2021

(65) Prior Publication Data

US 2022/0109154 A1  Apr. 7, 2022

Related U.S. Application Data

(60) Provisional application No. 63/086,729, filed on Oct. 2, 2020.

(51) Int. Cl.
*H01M 4/58* (2010.01)
*H01M 4/38* (2006.01)
(Continued)

(52) U.S. Cl.
CPC ........... *H01M 4/58* (2013.01); *H01M 4/0407* (2013.01); *H01M 4/382* (2013.01); *H01M 4/581* (2013.01);
(Continued)

(58) Field of Classification Search
CPC ............ H01M 4/04; H01M 4/58; H01M 4/38; H01M 4/66; H01M 10/0525; H01M 10/057
See application file for complete search history.

(56) References Cited

U.S. PATENT DOCUMENTS

| 6,410,188 B1* | 6/2002 | Shirane | H01M 4/36 429/231.95 |
| 2009/0217513 A1* | 9/2009 | Xi | C01G 53/50 429/231.95 |

(Continued)

FOREIGN PATENT DOCUMENTS

JP  6112912 B2  9/2014

OTHER PUBLICATIONS

Geifman, I. N., et al., "Crystal structure and V4+ EPR of the Li—Ti double oxyorthophosphate α-LiTiOPO4," Kristallografiya 38, pp. 88-94, Nov.-Dec. 1993.

(Continued)

*Primary Examiner* — Kenneth J Douyette
(74) *Attorney, Agent, or Firm* — CANTOR COLBURN LLP

(57) ABSTRACT

A solid-state ion conductor including a compound of Formula 1:

$$Li_{1+(4-a)y}A^a{}_yM_{1-y}XO_5 \quad \text{Formula 1}$$

wherein, in Formula 1, A is an element of Groups 1 to 3 or 11 to 13, or a combination thereof, wherein an oxidation state a of A is $1 \leq a \leq 3$, M is an element having an oxidation state of +4 of Groups 4 or 14, or a combination thereof, X (Continued)

is an element having an oxidation state of +5 of Groups 5, 15, 17, or a combination thereof, and $0<y\leq 1$.

15 Claims, 6 Drawing Sheets

(51) Int. Cl.
  *H01M 4/04* (2006.01)
  *H01M 10/0525* (2010.01)
  *H01M 4/66* (2006.01)
  *H01M 10/056* (2010.01)
  *H01M 4/02* (2006.01)
(52) U.S. Cl.
  CPC ........... *H01M 4/582* (2013.01); *H01M 4/662* (2013.01); *H01M 10/056* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2012/0009483 A1 | 1/2012 | Chu et al. |
| 2015/0333315 A1 | 11/2015 | Yoon et al. |
| 2016/0190545 A1* | 6/2016 | Momo ................... C25D 11/00 429/231.95 |
| 2017/0117535 A1 | 4/2017 | Yoon et al. |
| 2020/0176812 A1 | 6/2020 | Wang et al. |

OTHER PUBLICATIONS

Geifman, I. N., et al., "EPR of V4+ in lithium (sodium) and titanium oxyphosphate and superionic conductivity of these single crystals," Ferroelectrics, 192:1, pp. 87-91, DOI: 10.1080/00150199708216174, published online Oct. 26, 2011.

He, Xingfeng, et al., "Crystal Structural Framework of Lithium Super-Ionic Conductors," Adv. Energy Mater. 2019, 9, 1902078, 12 pages.

Morimoto, Hideyuki, et al., "Charge/discharge Behavior of Triclinic LiTiOPO4 Anode Materials for Lithium Secondary Batteries," Electrochemistry, 84(11), pp. 878-881, Nov. 5, 2016.

Sendek, Austin D., et al., "Machine Learning-Assisted Discovery of Solid Li-Ion Conducting Materials," DOI: 10.1021/acs.chemmater. 8b03272, Chem. Mater. 2019, 31, pp. 342-352.

\* cited by examiner 605 610 620 630 635

SOLID-STATE LITHIUM-ION CONDUCTOR AND METHODS OF MANUFACTURE THEREOF

CROSS-REFERENCE TO RELATED APPLICATION

This application claims priority to U.S. Provisional Patent Application No. 63/086,729, filed on Oct. 2, 2020, in the United States Patent and Trademark Office, and all the benefits accruing therefrom under 35 U.S.C. § 119, the content of which is incorporated herein in its entirety by reference.

BACKGROUND

(1) Field

Disclosed is a solid-state lithium-ion conductor and methods of manufacturing the solid-state lithium-ion conductor. Also disclosed is a positive electrode comprising the solid-state lithium-ion conductor, a negative electrode comprising the solid-state lithium-ion conductor, and a solid-state battery comprising the solid-state lithium-ion conductor.

(2) Description of the Related Art

Solid-state lithium batteries can provide improved specific energy and energy density, and can avoid safety concerns associated with flammable organic solvents used in liquid electrolytes. Oxide and sulfide solid-state electrolytes have been used. Available sulfides can provide greater lithium conductivity than oxides, however they also present safety concerns, for example reaction with air or water to evolve hydrogen sulfide. Oxides can provide reduced toxicity relative to sulfides, and stability in air, but application of available oxides is limited because of their low conductivity or incompatibility with high-voltage cathode materials or lithium metal.

Thus there remains a need for a solid-state electrolyte which provides improved ionic conductivity and avoids the toxicity and safety concerns associated with sulfides.

SUMMARY

Disclosed is a solid-state ion conductor comprising a compound of Formula 1:

$$Li_{1+(4-a)y}A^a_y M_{1-y} XO_5 \quad \text{Formula 1}$$

wherein, in Formula 1, A is an element of Groups 1 to 3 or 11 to 13, or a combination thereof, wherein an oxidation state a of A is $1 \leq a \leq 3$, M is an element having an oxidation state of +4 of Groups 4 or 14, or a combination thereof, X is an element having an oxidation state of +5 of Groups 5, 15, 17, or a combination thereof, and $0 < y \leq 1$.

Also disclosed is a positive electrode comprising: a positive active material layer comprising a lithium transition metal oxide, a lithium transition metal phosphate, or a combination thereof; and the solid-state ion conductor on the positive active material layer.

Also disclosed is a negative electrode comprising: a negative active material comprising lithium metal, a lithium metal alloy, or combination thereof; and the solid-state ion conductor on the negative active material.

Also disclosed is a negative electrode for a lithium secondary electrochemical cell, the electrode comprising: a current collector; and the solid-state ion conductor on the current collector.

Also disclosed is an electrochemical cell comprising: a positive electrode; a negative electrode; and an electrolyte between the positive electrode and the negative electrode, wherein at least one of the positive electrode, the negative electrode, or the electrolyte comprises the solid-state ion conductor.

BRIEF DESCRIPTION OF THE DRAWINGS

The following figures are exemplary embodiments wherein the like elements are numbered alike, in which.

DETAILED DESCRIPTION

Figure 1A:
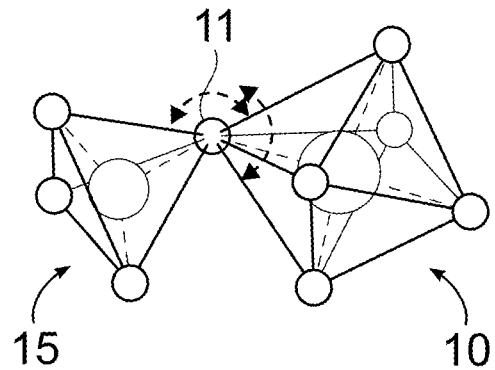
FIGS. 1A and 1B are schematic diagrams illustrating corner-sharing and isolated polyhedra, respectively.
Figure 1B:
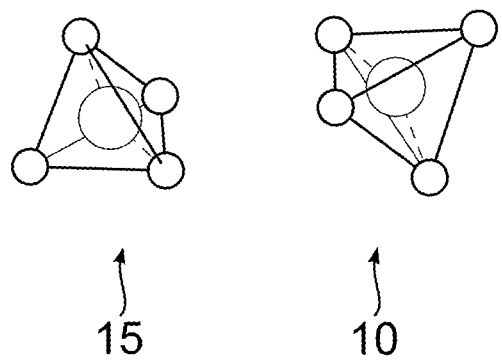
Figure 1C:
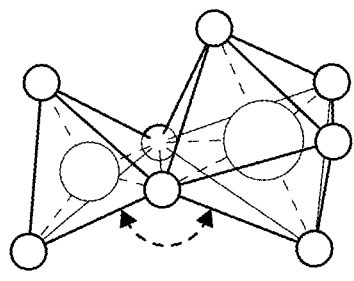
FIGS. 1C and 1D are schematic diagrams illustrating edge-sharing and face-sharing polyhedra, respectively.
Figure 1D:
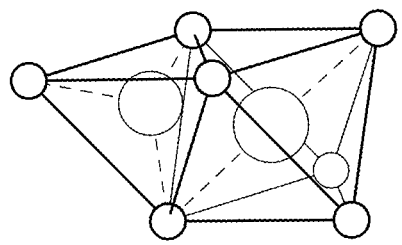

The inventors have discovered an inorganic solid-state ionic conductor that has high ionic conductivity and is useful as a solid electrolyte in a solid-state battery. The disclosed solid-state ionic conductor has a structure in which non-lithium cation-centered polyhedra are present and interconnected by a single corner-shared anion (e.g., oxygen), or the non-lithium cation-centered polyhedra are not interconnected, i.e., they do not share an anion. This structural aspect is shown schematically in FIG. 1A, which shows corner-sharing polyhedra, e.g., a Ti-centered TiO$_6$ octahedron 10 sharing a single oxygen 11 with a P-centered PO$_4$ tetrahedron 15, and FIG. 1B, which shows isolated polyhedra, e.g., an isolated P-centered PO$_4$ tetrahedron and an isolated Ti-centered TiO$_6$ octahedron. While not wanting to be bound by theory, it is understood that in the disclosed materials, non-lithium cation-centered polyhedra never share an edge or face, as shown schematically in FIGS. 1C and 1D, respectively, where the polyhedra share 2 or 3 oxygens, respectively, resulting in edge or face sharing, respectively.

Figure 2:
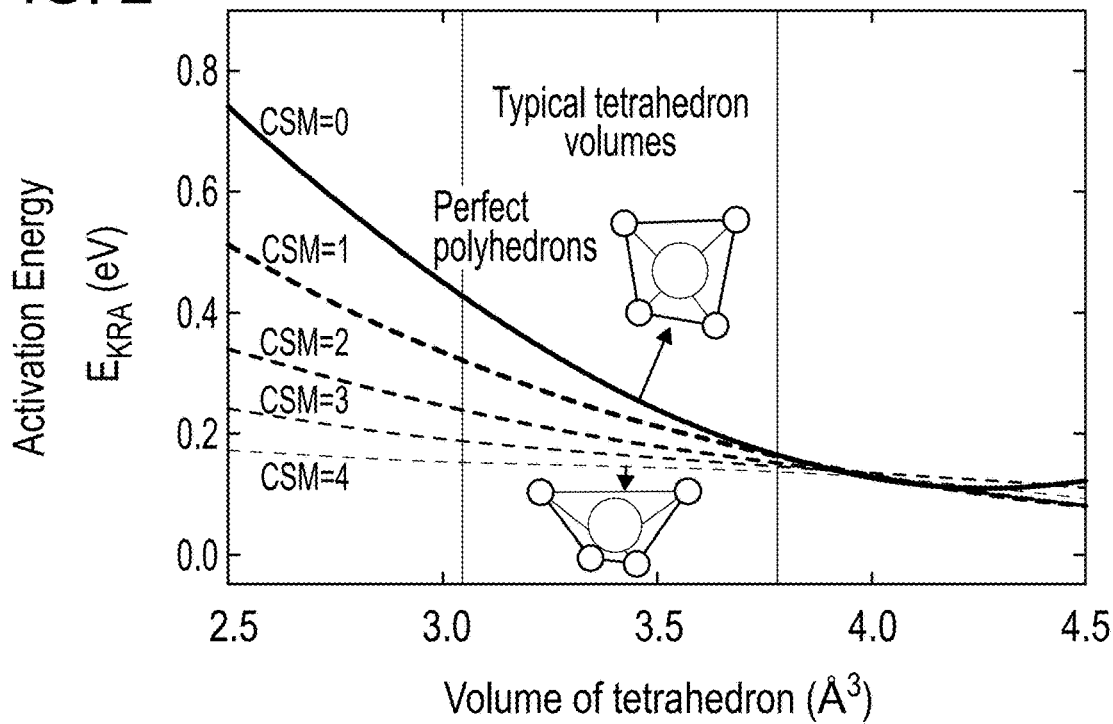
FIG. 2 is a graph of activation energy (electron volts) versus tetrahedron volume (cubic Angstroms) illustrating the reduction in activation energy as the lithium coordination environment is distorted.

While not wanting to be bound by theory, it is understood that the ionic conductivity is improved in these materials because these crystal structures with corner-sharing frameworks provide highly distorted environments for lithium to occupy. The more distorted lithium environment is understood to result in reduced activation energy, and thus improved ionic conductivity. The reduced activation energy and improved ionic conductivity, is shown schematically in FIG. 2, which shows that the lithium-ion kinetically resolved activation energy ($E_{KRA}$) is reduced with greater distortion of the tetrahedral lithium coordination environment. The degree of distortion can be determined using continuous symmetry measure (CSM) as a metric. CSM and its determination is further described in Pinsky, M. & Avnir, D., Continuous Symmetry Measures 5, The Classical Polyhedra. Inorg Chem, 37, 5575-5582 (1998), the content of which is incorporated herein by reference in its entirety. The minimum CSM of 0 corresponds to a perfectly symmetric coordination environment and the maximum of 67 corresponds to infinite elongation along a single axis. When no distortion is present (CSM=0) the average lithium environment is symmetric, and as the lithium environment is distorted (CSM=1 to 4), the activation energy is reduced. In the disclosed solid-state ion conductor, the average CSM for lithium is 0<CSM<20, 0.1<CSM<10, 0.2<CSM<5, or 0.4<CSM<4.

The disclosed solid-state ion conductor comprises a compound of Formula 1:

$$Li_{1+(4-a)y}A^a_y M_{1-y}XO_5 \quad \text{Formula 1}$$

wherein, in Formula 1, A is an element of Groups 1 to 3 or 11 to 13, or a combination thereof, wherein an oxidation state a of A is 1≤a≤3, M is an element having an oxidation state of +4 of Groups 4 or 14, or a combination thereof, X is an element having an oxidation state of +5 of Groups 5, 15, 17, or a combination thereof, and 0<y≤1.

As used herein, "Group" means a group of the Periodic Table of the Elements according to the International Union of Pure and Applied Chemistry ("IUPAC") Group 1-18 group classification system.

Figure 3:
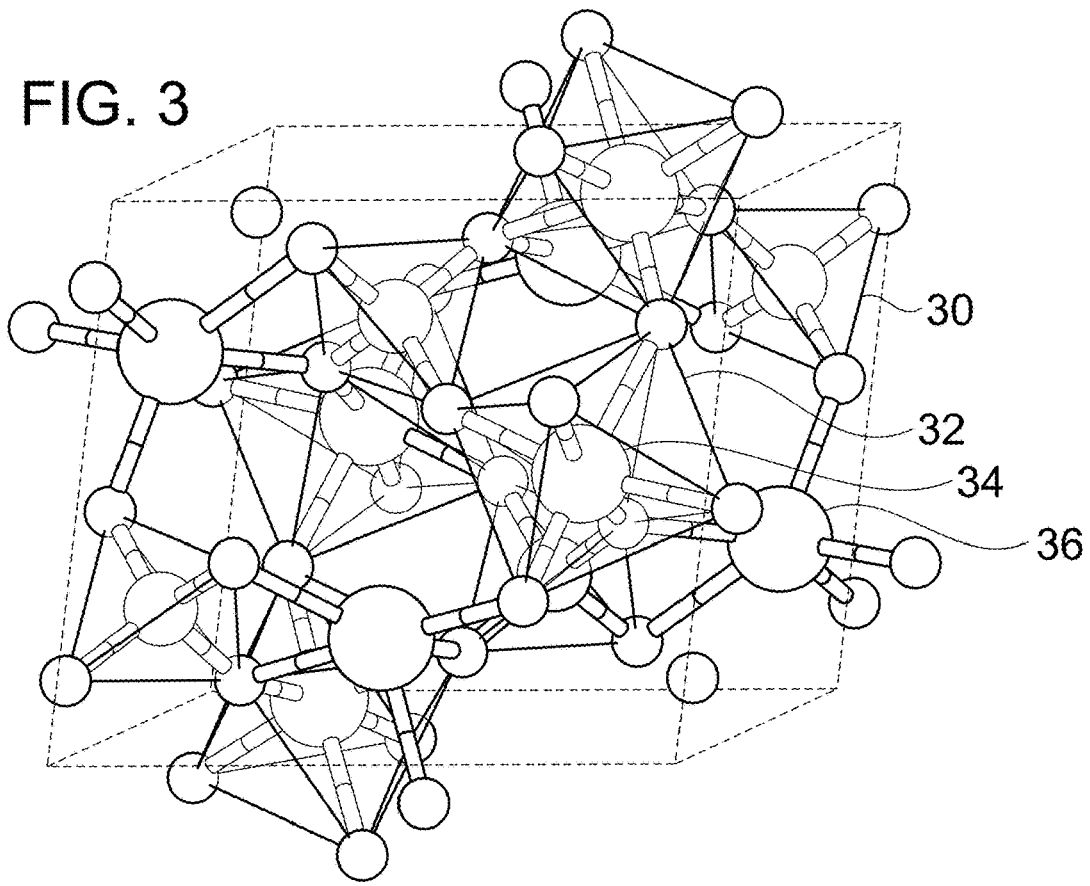
FIG. 3 is an illustration of an embodiment of the structure of P-1 LiTiPO$_5$.

While not wanting to be bound by theory, the solid-state ion conductor of Formula 1 is understood to adopt a structure having a unit cell as shown schematically in FIG. 3, which comprises corner-sharing $PO_4$ tetrahedra 30 and $TiO_6$ octahedra 32. Also indicated in FIG. 3 is Li 36. The dopant A is understood to substitute on the M sites 34. Use of the dopant A is understood to result in improved lithium concentration that permits the lithium to access additional distorted Li sites within the structure, which in turn is understood to cause reduced activation energy and increased ionic conductivity. As shown, the solid-state ion conductor of Formula 1 is understood to adopt a structure in which non-lithium cation polyhedrons are interconnected by a corner-shared oxygen, and do not share any common edges (O—O bond) or faces (O—O—O triangle). In an aspect the solid-state ion conductor of Formula 1 adopts a triclinic structure, e.g., in space group P-1 (space group 2).

The dopant A can be a cationic element having an oxidation state a of +1, +2, +3, or combination thereof. The dopant A can comprise an element of Group 1, such as Na, K, Cs, or a combination thereof. The dopant A can comprise an element of Group 2, such as Mg, Ca, Sr, or a combination thereof. The dopant A can comprise an element of Group 3, such as Sc, Y, La, or a combination thereof. The dopant A can be lanthanide, i.e., an element having an atomic number of 58 to 71, e.g., Ce, Pr, Nd, Sm, Eu, or Gd. The dopant A can comprise an element of Group 11, such as Cu, Ag, or a combination thereof. The dopant A can comprise a Group 12 element such as Zn. The dopant A can comprise a Group 13 element such as Al, Ga, In, or a combination thereof. A combination comprising at least one of the foregoing dopants can be used. For example, use of Ga and In, or Mg and Ga, is disclosed.

The oxidation state a of the dopant A can be 1≤a≤3, 1.5≤a≤2.75, or 2≤a≤2.5. When the dopant comprises elements having different oxidation states, the oxidation state a of the dopant is a weighted-average oxidation state based on the molar content of the dopant elements. For example, when the dopant A comprises Mg and Ga, the oxidation state a is a weighted-average of the +2 oxidation state of Mg and the +3 oxidation state of Ga, based on the molar content of Mg and Ga in the compound of Formula 1. Thus, if equal amounts of Mg and Ga are used, a in Formula 1 is 2.5. The content of the dopant y is 0<y≤1, 0.01<y≤0.5, 0.03<y≤0.3, or 0.05<y≤0.25. Use of y=0.6 is mentioned.

In Formula 1, M is a cationic element having an oxidation state of +4. M can comprise an element of Group 4, such as Ti, Zr, Hf, or a combination thereof, an element of Group 14, such as Si, Ge, Sn, or a combination thereof. A combination comprising a Group 4 and a Group 14 element is also disclosed. Use of Ti is mentioned.

In Formula 1, X is an element having an oxidation state of +5. In Formula 1, X can comprise an element of Group 5, such as V, Nb, Ta, or a combination thereof, an element of Group 15, such as P, As, Sb, Bi, or a combination thereof, or an element of Group 17, such as Cl, Br, I, or a combination thereof. Use of a combination of any of the foregoing is disclosed. Mentioned is use of P or As.

The solid-state ion conductor comprising the compound of Formula 1 can have an ionic conductivity equal to or greater than of $1 \times 10^{-7}$ siemens per centimeter (S/cm), at 23° C. For example, the solid-state ion conductor comprising the compound of Formula 1 may have an ionic conductivity of $1 \times 10^{-6}$ S/cm to $1 \times 10^{-2}$ S/cm, $1 \times 10^{-6}$ S/cm to $1 \times 10^{-1}$ S/cm $1 \times 10^{-5}$ S/cm to $5 \times 10^{-2}$ S/cm, or $1 \times 10^{-4}$ S/cm to $1 \times 10^{-2}$ S/cm, at 23° C. Ionic conductivity may be determined by a complex impedance method at 23° C., further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety. Alternatively, ionic conductivity can be determined by AIMD. AIMD is described in Ong, S. P. et al. Phase stability, electrochemical stability and ionic conductivity of the Li 10±1 MP 2×12 (M=Ge, Si, Sn, Al or P, and X=O, S or Se) family of superionic conductors. Energ Environ Sci 6, 148-156 (2012), the content of which is incorporated herein by reference in its entirety.

In an aspect, the solid-state ion conductor may comprise, but is not limited to a composition in which $LiTiPO_5$ is doped with Mg, e.g., $Li_{1.125}Ti_{0.9375}Mg_{0.0625}PO_5$, or wherein the dopant comprises Al, Ga, or In, as in $Li_{1.0625}Ti_{0.9375}Al_{0.0625}PO_5$, $Li_{1.0625}Ti_{0.9375}Ga_{0.0625}PO_5$, or $Li_{1.0625}Ti_{0.9375}In_{0.0625}PO_5$.

A method for the manufacture of the solid-state ion conductor is also disclosed. The solid-state ion conductor of Formula 1 may be prepared by contacting a lithium compound, a compound comprising the dopant A, e.g., a compound comprising an element having an oxidation state a of 1≤a≤3 of Groups 1 to 3 or 11 to 13, or a combination thereof, a compound comprising an element having an oxidation state of +4 of Groups 4 or 14, or a combination thereof, and a compound comprising an element having an oxidation state of +5 of Groups 5, 15, 17, or a combination thereof to provide a mixture; and treating the mixture to provide a compound of Formula 1. For example, the lithium compound maybe $Li_2CO_3$, the compound comprising the dopant A may be $Ga_2O_3$, the compound comprising an element having an oxidation state of +4 may be $TiO_2$, and the compound comprising an element having an oxidation state of +5 may be $P_2O_5$. The foregoing may be used in stoichiometric amounts.

The treating may comprise any suitable method, e.g., mechanochemically milling, or heat-treating. For example, treating the precursor mixture can be by mechanochemically milling at a speed and for a time effective to provide the compound of Formula 1. The mechanochemical milling can be conducted under any suitable atmosphere, e.g., in air, using any suitable medium, e.g., using zirconia balls in a stainless steel container. Use of milling for 1 to 100 hours, or 10 to 30 hours, at 200 to 1000 RPM, 225 to 600 RPM, or 250 to 450 RPM is mentioned.

The treating of the mixture may alternatively or additionally comprise heat treating. The heat treating may include heat-treating at a temperature and for a time effective to provide the compound according to Formula 1. The heat-treating may comprise heat-treating at 400° C. to 1000° C., or 500° C. to 800° C., for 0.5 to 12 hours, or 0.7 to 2 hours, in any suitable atmosphere, e.g., air.

The disclosed method provides the solid-state ion conductor having desirable ionic conductivity and stability, e.g., stability between 1.5 volts (V versus $Li/Li^+$) to 5 V, e.g., 1.75 V to 4.8 V, 2 V to 4.6V, or 2.5 V to 4.4 V, versus $Li/Li^+$. In an embodiment, the solid-state ion conductor is at least kinetically stable when contacted with a lithium transition metal oxide positive electrode active material, such as lithium nickel cobalt manganese oxide or lithium nickel cobalt aluminum oxide, or a lithium transition metal phosphate positive electrode active material, such as lithium iron phosphate. Also, the solid-state ion conductor may be at least kinetically stable when contacted with lithium metal, e.g., the solid-state ion conductor does not form an alloy or compound when contacted with lithium metal.

Figure 4:
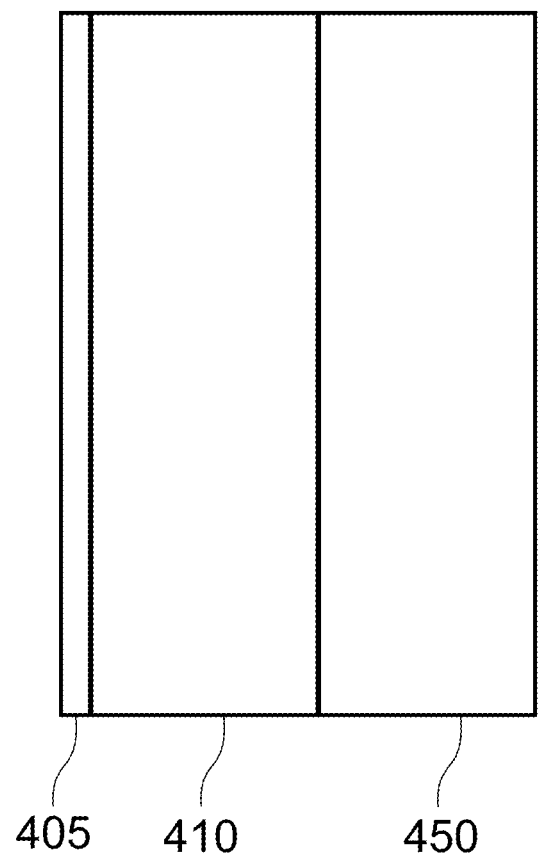
FIG. 4 shows an embodiment of a protected positive electrode.

The solid-state ion conductor can be disposed on a positive active material layer to provide a protected positive electrode, shown schematically in FIG. 4, which includes a current collector 405, a positive active material layer 410 and protection layer 450 comprising the solid-state ion conductor on the positive active material layer. While not wanting to be bound by theory, it is understood that use of the protection layer comprising the solid-state ion conductor can avoid degradation of the positive active material, resulting in improved performance. The protection layer may be disposed on the positive active material layer by sputtering, for example.

Figure 5:
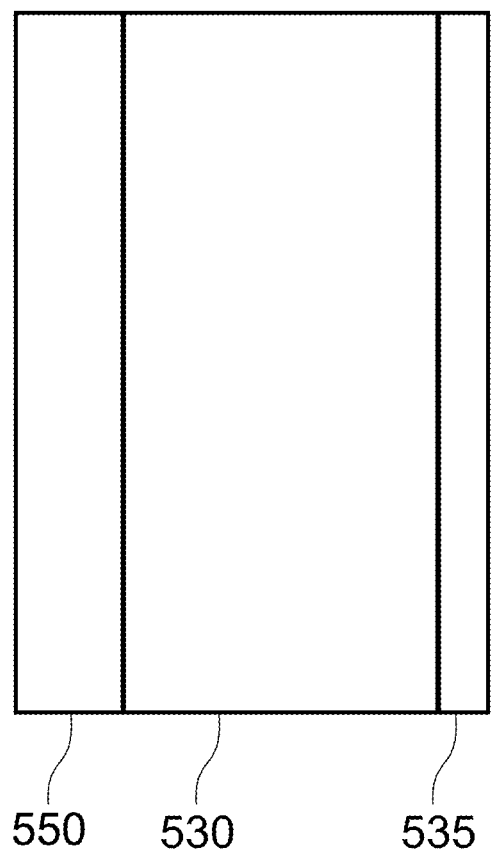
FIG. 5 shows an embodiment of a protected negative electrode.

Also disclosed is a protected negative electrode, shown schematically in FIG. 5. The protected negative electrode comprises a negative active material layer 530 on a current collector 535, and a protection layer 550 comprising the solid-state ion conductor of Formula 1 on the negative active material layer. While not wanting to be bound by theory, it is understood that use of the protection layer comprising the solid-state ion conductor of Formula 1 can avoid degradation of the negative active material, resulting in improved performance. The protection layer may be disposed by sputtering, for example.

Figure 6:
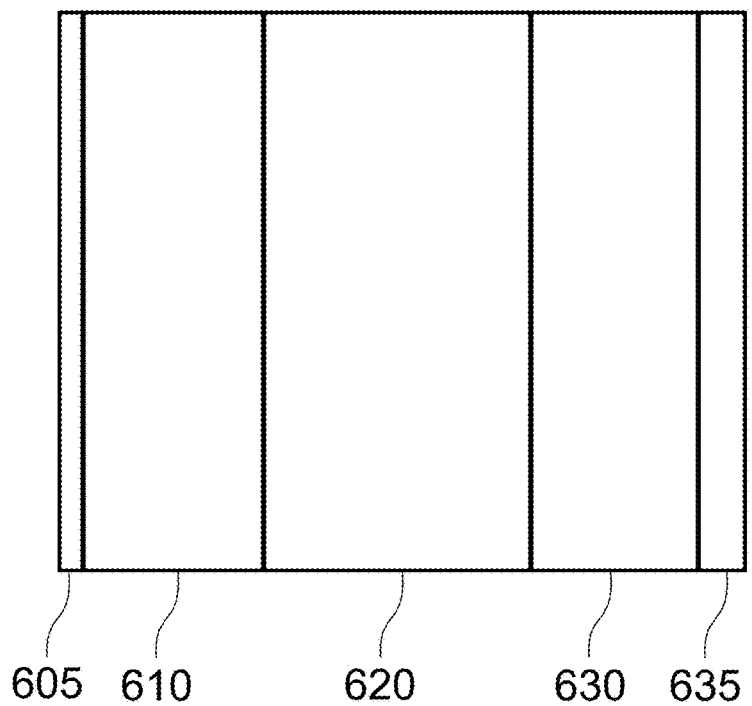
FIG. 6 shows an embodiment of a solid-state lithium battery.

The solid-state ion conductor according to Formula 1 can be disposed between positive and negative electrodes and can serve as a solid electrolyte in a lithium battery, shown schematically in FIG. 6. Included in the lithium battery shown in FIG. 6 is a positive electrode comprising a positive active material layer 610 on a positive current collector 605, an electrolyte layer 620, and a negative electrode comprising a negative active material layer 630 on negative current collector 635. In an aspect, the positive electrode may be a protected positive electrode. In an aspect, the negative electrode may be a protected negative electrode. It is understood that the positive electrode could alternatively be referred to as a cathode, and the negative electrode as an anode. For the positive current collector aluminum or stainless steel may be used, and for the negative current collector copper, stainless steel or titanium may be used.

The lithium battery can be manufactured by providing the positive electrode, disposing the solid-state ion conductor on the positive electrode, e.g., by sputtering, to provide an electrolyte layer, and then disposing the negative electrode on the electrolyte layer. The resulting structure may be wound or folded, and disposed in a cylindrical or rectangular case or pouch to contain the lithium battery.

The electrolyte layer may comprise the solid-state ion conductor of Formula 1. In an aspect, the electrolyte layer is suitably electrically insulating to serve as a separator to electrically isolate the positive electrode from the negative electrode.

The electrolyte layer may alternatively or additionally comprise a solid electrolyte other than or in addition to the solid-state ion conductor of Formula 1. The solid electrolyte may comprise, for example, at least one of the oxide-containing solid electrolyte or the sulfide-containing solid electrolyte.

Examples of the oxide-containing solid electrolyte may include $Li_{1+x+y}Al_xTi_{2-x}Si_yP_{3-y}O_{12}$ (where $0<x<2$ and $0\leq y\leq 3$), $BaTiO_3$, $Pb(Zr_aTi_{1-a})O_3$(PZT) where $0\leq a\leq 1$, $Pb_{1-x}La_xZr_{1-y}Ti_yO_3$ (PLZT) where $0\leq x<1$ and $0\leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0\leq x\leq 1$, $0\leq y\leq 1$, $0\leq a\leq 1$, and $0\leq b\leq 1$, $Li_xLa_yTiO_3$ where $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ where M is Te, Nb, or Zr, and $0\leq x\leq 10$. Also mentioned is $Li_7La_3Zr_2O_{12}$ (LLZO) or $Li_{3+x}La_3Zr_{2-a}Me_aO_{12}$ (e.g., Me-doped LLZO, where Me is Ga, W, Nb, Ta, or Al, and $0\leq x\leq 10$ and $0\leq a<2$). A combination comprising at least one of the foregoing may be used.

Examples of the sulfide-containing solid electrolyte may include at least one of $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—$LiC_1$, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ where m and n each are a positive number, Z represents any of Ge, Zn, and Ga, $Li_2S$—$GeS_2$, $Li_2S$—$SiS_2$—$Li_3PO_4$, $Li_2S$—$SiS_2$—$Li_pMeO_q$ (where p and q each are a positive number, Me represents at least one of P, Si, Ge, B, Al, Ga, or In), $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where $0\leq x\leq 2$). The sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$—$P_2S_5$ is used as a sulfide-containing solid electrolyte material, a mixing molar ratio of $Li_2S$ and $P_2S_5$ ($Li_2S:P_2S_5$) may be, for example, selected in a range of about 50:50 to about 90:10. The sulfide-containing solid electrolyte may also comprise an argyrodite-type solid electrolyte, such as $Li_{7-x}PS_{6-x}Cl_x$(where $0\leq x\leq 2$), $Li_{7-x}PS_{6-x}Br_x$ (where $0 \leq x \leq 2$), or $Li_{7-x}PS_{6-x}I_x$ (where $0 \leq x \leq 2$), e.g., $Li_6PS_5Cl$, $Li_6PS_5Br$, or $Li_6PS_5I$.

The electrolyte layer comprising the solid-state ion conductor may be non-porous, or have a porosity of 0% (no pores) to 25%, based on a total volume of the solid-state ion conductor. The porosity may be, for example, 0% to 25%, 1% to 20%, 5% to 15%, or 7% to 12%, based on a total volume of the electrolyte layer. The porosity of electrolyte layer may be determined by scanning electron microscopy, the details of which can be determined by one of skill in the art without undue experimentation. Alternatively, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the details of which can be determined by one of skill in the art without undue experimentation.

In an aspect, the electrolyte layer is porous, and an ionic liquid, a polymer-ionic liquid, a liquid electrolyte comprising a lithium salt and an organic solvent, or a combination thereof is disposed in a pore of the electrolyte layer to provide a hybrid electrolyte.

The ionic liquid (e.g., molten salt) may comprise i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. Examples of the ionic liquid include N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, 1-ethyl-3-methyl-imidazolium bis(trifluoromethylsulfonyl)imide, or a combination thereof.

The polymer ionic liquid may be a polymerization product of ionic liquid monomers, or a polymeric compound. The polymer ionic liquid may include a repeating unit that includes i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

For the liquid electrolyte comprising a lithium salt and an organic solvent, the lithium salt may be a lithium salt of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO$, or a combination thereof. The organic solvent may comprise a carbonate such as propylene carbonate, ethylene carbonate, fluoroethylene carbonate, butylene carbonate, dimethyl carbonate, diethyl carbonate, methyl ethyl carbonate, or a combination thereof.

The electrolyte layer may further comprise a separator film. The separator film may be electrically insulating, and may comprise polyethylene, polypropylene, polyvinylidene fluoride, or a combination thereof. For example, the separator film may be a multilayer separator film, such as a two-layer separator of polyethylene/polypropylene, a three-layer separator of polyethylene/polypropylene/polyethylene, or a three-layer separator of polypropylene/polyethylene/polypropylene. The separator film may have a pore diameter of 0.01 μm to 10 μm, and a thickness of 5 μm to 20 μm. If present, the liquid electrolyte, ionic liquid, or polymer ionic-liquid electrolyte may be disposed in a pore of the separator film.

In an embodiment, other electrolytes, such as a liquid electrolyte or ionic-liquid (e.g., molten salt) electrolyte is excluded from the lithium battery of the present disclosure.

The electrolyte layer may have any suitable thickness. A thickness of the solid electrolyte layer may be 1 to 300 μm, 2 to 100 μm or 30 to 60 μm.

The positive electrode comprises a positive active material layer comprising a lithium transition metal oxide, a lithium transition metal phosphate, or a combination thereof. For example, the positive active material can be a compound represented by any of $Li_aM^1_{1-b}M^2_bD_2$ wherein $0.90 \leq a \leq 1.8$ and $0 \leq b \leq 0.5$; $Li_aE_{1-b}M^2_bO_{2-c}D_c$ wherein $0.90 \leq a \leq 1.8$, $0 \leq b \leq 0.5$, and $0 \leq c \leq 0.05$; $LiE_{2-b}M^2_bO_{4-c}D_c$ wherein $0 \leq b \leq 0.5$ and $0 \leq c \leq 0.05$; $Li_aNi_{1-b-c}Co_bM^2_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bM^2_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Co_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM^2_cD_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM^2_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; or $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0<x<1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, or $FeS_3$. For example, the positive active material may comprise NMC 811 ($LiNi_{0.8}Mn_{0.1}Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), or NCA ($LiNi_{0.8}Co_{0.15}Al_{0.05}O_2$).

The positive active material layer may further include a binder. A binder can facilitate adherence between components of the positive active material layer, and adherence of the positive active material layer to the current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The positive active material layer may further include a conductive agent. Any suitable conductive agent may be used. The conductive agent may comprise a carbon, a metal, or an oxide. The carbon may comprise carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. The metal may comprise a metal element, e.g., nickel, and may by in the form of a fiber or powder, such as aluminum powder or a nickel powder. The conductive agent may comprise an oxide, such as a zinc oxide or a potassium titanate; or a conductive polymer, such as a polyethylene oxide or a polyphenylene derivative. A combination comprising at least one of the foregoing conductive agents may be used. An amount of the conducting agent may be from about 1 part by weight to about 10 parts by weight, for example, from about 2 parts by weight to about 5 parts by weight, based on 100 parts by weight of the total weight of the positive active material.

The positive active material layer may alternatively or additionally comprise a solid electrolyte other than or in addition to the solid-state ion conductor of Formula 1. The solid electrolyte may comprise, for example, the oxide-containing solid electrolyte, the sulfide-containing solid electrolyte, or a combination thereof.

The positive active material layer may be disposed on the surface of a substrate, e.g., an aluminum foil current collector, using any suitable means, for example, using tape casting, slurry casting, or screen printing. Additional details of tape casting and screen printing, for example suitable binders and solvents, can be determined by one of skill in the art without undue experimentation.

The positive active material layer may have any suitable thickness, e.g., a thickness of 1 to 300 µm, 2 µm to 100 µm, or 30 to 60 µm.

The negative electrode may comprise a negative active material layer on a current collector. The negative active material layer may comprise carbon, a non-transition metal oxide, lithium metal, a lithium metal alloy, or a combination thereof. The carbon may comprise natural graphite or artificial graphite, each of which may be crystalline or amorphous. Examples of the amorphous carbon include soft carbon, hard carbon, mesocarbon, mesophase pitch carbon, and calcined coke. The non-transition metal oxide may comprise $SnO_2$ or $SiO_x$ where $0<x\leq2$. The lithium metal alloy for the negative electrode may include lithium, and a metal or metalloid alloyable with lithium. Examples of the metal or metalloid alloyable with lithium include Si, Sn, Al, Ge, Pb, Bi, Sb, a Si—Y' alloy (wherein Y' is at least one of an alkali metal, an alkaline earth metal, a Group 13 to Group 16 element, a transition metal, or a rare earth element, except for Si), or a Sn—Y' alloy (wherein Y' is at least one of an alkali metal, an alkaline earth metal, a Group 13 to Group 16 element, a transition metal, or a rare earth element, except for Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Ge, P, As, Sb, Bi, S, Se, Te, Po, or a combination thereof. The current collector for the negative electrode may be copper or titanium, for example.

The negative electrode may be an "anode-free" type wherein lithium is not initially present in the negative electrode. In the "anode-free" type negative electrode, the negative electrode may initially comprise a current collector and a solid electrolyte, e.g., the solid-state ion conductor of Formula 1, or alternatively or in addition at least one of the oxide-containing solid electrolyte or the sulfide-containing solid electrolyte on the current collector. In an aspect, the solid-state ion conductor, the solid electrolyte, or a combination thereof is directly on the current collector. Charging the battery can deposit lithium to form the negative active material layer on the current collector, e.g., to deposit lithium metal or form a lithium metal alloy on the current collector. The solid-state ion conductor of Formula 1, or alternatively or in addition at least one of the oxide-containing solid electrolyte or the sulfide-containing solid electrolyte may be disposed on the current collector by sputtering, for example.

The lithium battery can be manufactured by providing the positive electrode, providing the negative electrode, and disposing the solid-state ion conductor comprising the compound according to Formula 1 between the positive electrode and the negative electrode. For example, the lithium battery can be manufactured by sputtering the solid-state ion conductor comprising the compound according to Formula 1 on the positive active material layer, disposing a negative electrode thereon, winding or folding the resulting structure, and then enclosing the wound or folded structure in a cylindrical or rectangular battery case or pouch to provide the lithium battery.

This disclosure is further illustrated by the following examples, which are non-limiting.

EXAMPLES

Comparative Example 1. $LiTiPO_5$

Stoichiometric amounts of $Li_2CO_3$ (0.3695 grams (g)), $TiO_2$ (0.7987 g), and $P_2O_5$ (0.7097 g) were mechanically milled at 450 RPM for 20 hours to prepare P-1 $LiTiPO_5$.

Example 1. $Li_{1.0625}Ti_{0.9375}Ga_{0.0625}PO_5$

Stoichiometric amounts of $Li_2CO_3$ (0.3926 g), $TiO_2$ (0.7487 g), $Ga_2O_3$ (0.0586 g), and $P_2O_5$ (0.7097 g) were mechanically milled at 450 RPM for 20 hours to prepare $Li_{1.0625}Ti_{0.9375}Ga_{0.0625}PO_5$.

Example 2. $Li_{1.12}Ti_{0.88}Ga_{0.12}PO_5$

Stoichiometric amounts of $Li_2CO_3$ (0.4157 g), $TiO_2$ (0.6988 g), $Ga_2O_3$ (0.1172 g), and $P_2O_5$ (0.7097 g) were mechanically milled at 450 RPM for 20 hours to prepare $Li_{1.12}Ti_{0.88}Ga_{0.12}PO_5$.

Example 3. $Li_{1.20}Ti_{0.80}Ga_{0.20}PO_5$

Stoichiometric amounts of $Li_2CO_3$ (0.4434 g), $TiO_2$ (0.6389 g), $Ga_2O_3$ (0.1874 g), and $P_2O_5$ (0.7097 g) were mechanically milled at 450 RPM for 20 hours to prepare $Li_{1.20}Ti_{0.80}Ga_{0.20}PO_5$.

X-ray Diffraction Analysis

Figure 7:
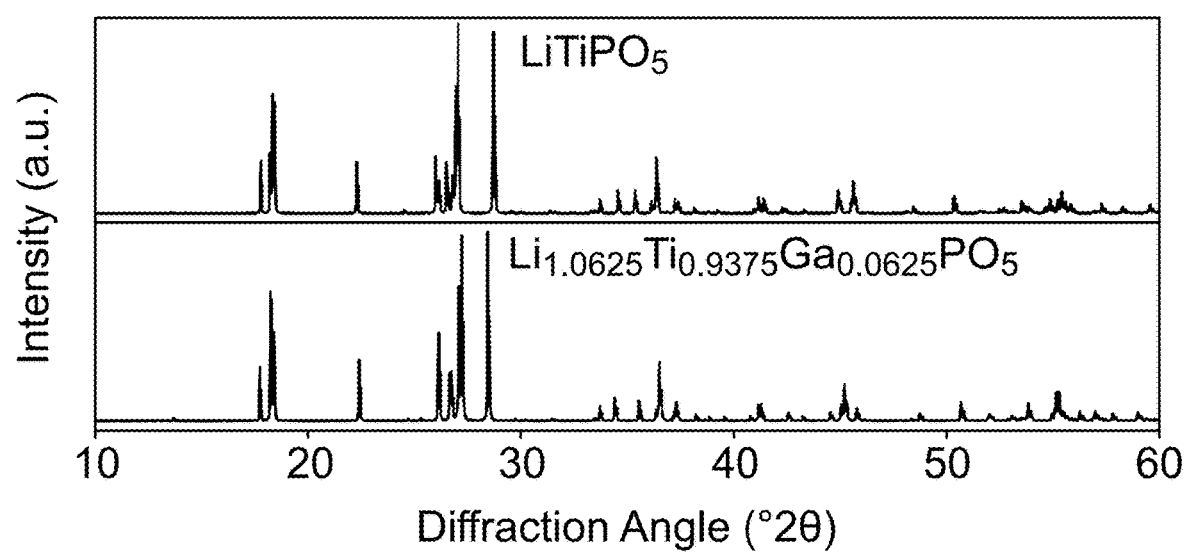
FIG. 7 is a graph of intensity (a.u.) versus diffraction angle showing the results of X-ray diffraction analysis of Comparative Example 1 and Example 1, using CuK$_\alpha$, radiation.

Shown in FIG. 7. are the results X-ray diffraction analysis of the LiTiPO$_5$ of Comparative Example 1 and the Li$_{1.0625}$Ti$_{0.9375}$Ga$_{0.0625}$PO$_5$. Analysis of the X-ray diffraction analysis shows that these materials adopt a structure in space group P-1.

Ion Conductivity Analysis

Figure 8:
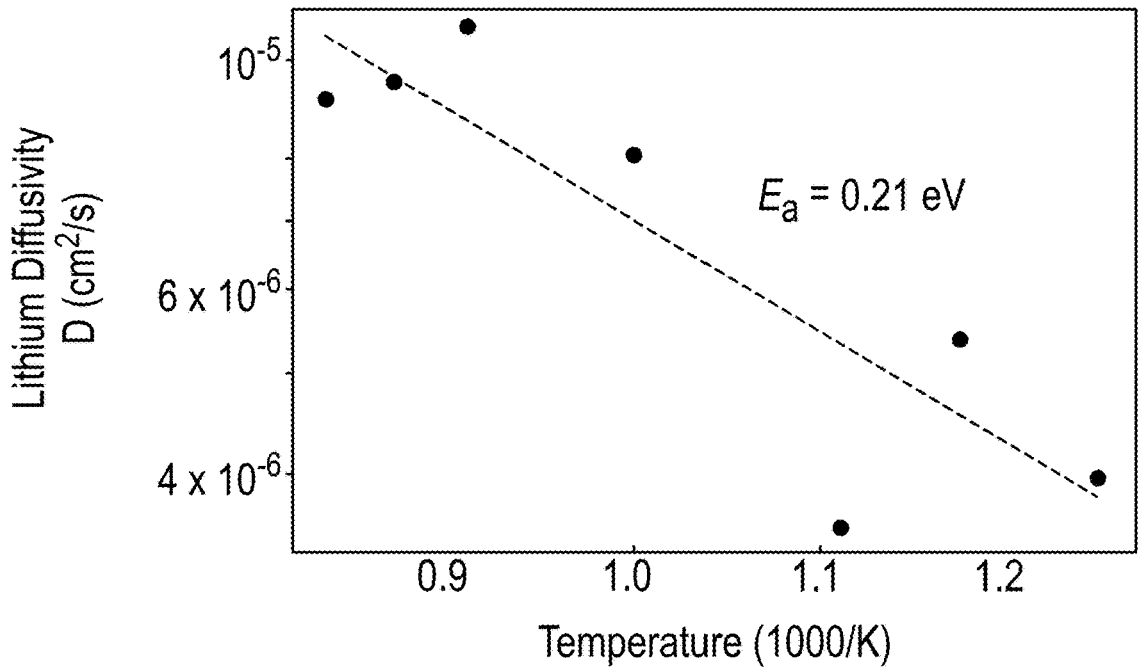
FIG. 8 is a graph of lithium diffusivity (cm$^2$/s) versus temperature showing the results of Arrhenius analysis of Example 1.

Li ion conductivity of Li$_{1.0625}$Ti$_{0.9375}$Ga$_{0.0625}$PO$_5$ is determined by AIMD, the results of which are shown in the Arrhenius plot shown in FIG. 8. Li$_{1.0625}$Ti$_{0.9375}$Ga$_{0.0625}$PO$_5$ is determined to have an activation energy of 0.21 electron volts (eV), and a conductivity at 23° C. of 1.73 mS/cm.

Figure 9:
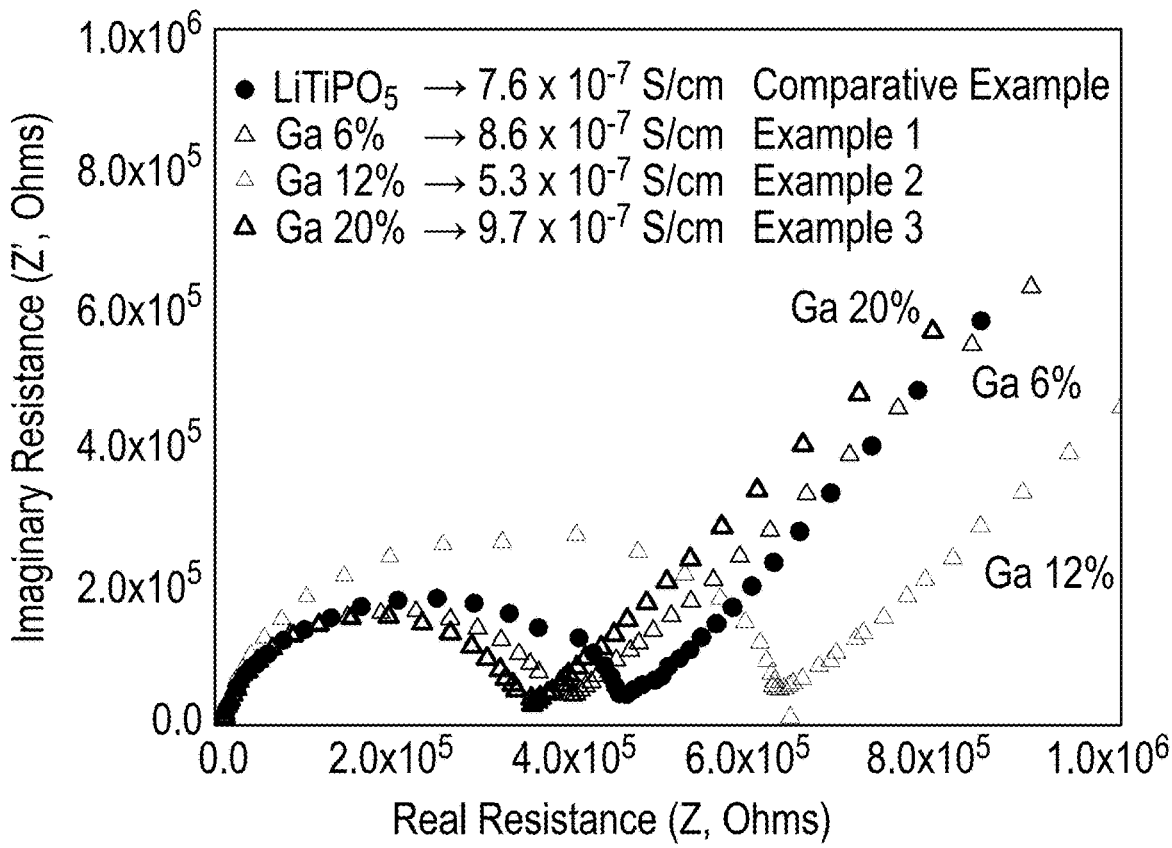
FIG. 9 is a graph of Imaginary Resistance (Ohms) versus Real Resistance (Ohms) and is a Nyquist plot showing the results of impedance analysis of the materials of Comparative Example 1 and Examples 1 to 3.

The Li ion conductivity of the LiTiPOs from Comparative Example 1, and the Li$_{1.0625}$Ti$_{0.9375}$Ga$_{0.0625}$PO$_5$ of Example 1, the Li$_{1.12}$Ti$_{0.88}$Ga$_{0.12}$PO$_5$ of Example 2, and the Li$_{1.20}$Ti$_{0.80}$Ga$_{0.20}$PO$_5$ Example 3 were evaluated in a blocking electrode cell by complex impedance at 23° C., according to the method disclosed in J.-M. Winand et al., "Measurement of Ionic Conductivity in Solid Electrolytes," Europhysics Letters, vol. 8, no. 5, p. 447-452, 1989, the content of which is incorporated herein by reference in its entirety. The results, shown in a Nyquist plot in FIG. 9, show that the ionic conductivity of the Li$_{1.0625}$Ti$_{0.9375}$Ga$_{0.0625}$PO$_5$ and Li$_{1.20}$Ti$_{0.80}$Ga$_{0.20}$PO$_5$ are unexpectedly improved relative to LiTiPO$_5$ and Li$_{1.12}$Ti$_{0.88}$Ga$_{0.12}$PO$_5$. The ionic conductivity results are summarized in Table 1.

TABLE 1

| Composition | Ionic Conductivity |
|---|---|
| LiTiPO$_5$ | 7.6 ×10$^{-7}$ S/cm |
| Li$_{1.0625}$Ti$_{0.9375}$Ga$_{0.0625}$PO$_5$ | 8.6 ×10$^{-7}$ S/cm |
| Li$_{1.12}$Ti$_{0.88}$Ga$_{0.12}$PO$_5$ | 5.3 ×10$^{-7}$ S/cm |
| Li$_{1.20}$Ti$_{0.80}$Ga$_{0.20}$PO$_5$ | 9.7 ×10$^{-7}$ S/cm |

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid-state ion conductor comprising a compound of Formula 1:

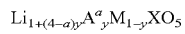

$$Li_{1+(4-a)y}A^a{}_yM_{1-y}XO_5 \qquad \text{Formula 1}$$

wherein, in Formula 1,
A is an element of Groups 1 to 3 or 11 to 13, or a combination thereof, wherein an oxidation state a of A is 1≤a≤3,
M is an element having an oxidation state of +4 of Groups 4, 14, or a combination thereof,
X is an element having an oxidation state of +5 of Groups 15, 17, or a combination thereof, and
0<y≤1.

2. The solid-state ion conductor of claim 1, wherein 0<y<1.

3. The solid-state ion conductor of claim 1, wherein A is Na, K, C, Mg, Ca, Sr, Sc, Y, La, Cu, Ag, Zn, Al, Ga, In, or a combination thereof.

4. The solid-state ion conductor of claim 1, wherein M is Ti, Zr, Hf, Si, Ge, Sn, or a combination thereof.

5. The solid-state ion conductor of claim 4, wherein M is Ti and X is P.

6. The solid-state ion conductor of claim 5, wherein A is Ga and a is 3.

7. The solid-state ion conductor of claim 6, wherein 0<y≤0.2.

8. The solid-state ion conductor of claim 1, wherein X is P, As, Sb, Bi, Cl, Br, I, or a combination thereof.

9. The solid-state ion conductor of claim 1, wherein M is Ti and X is P, and a structure of the solid-state ion conductor comprises corner-sharing $TiO_6$ octahedra and $PO_4$ tetrahedra.

10. A positive electrode comprising:
a positive active material layer comprising a lithium transition metal oxide, a lithium transition metal phosphate, or a combination thereof; and
the solid-state ion conductor of claim 1 on the positive active material layer.

11. A negative electrode comprising:
a negative active material layer comprising lithium metal, a lithium metal alloy, or combination thereof; and
the solid-state ion conductor of claim 1 on the negative active material layer.

12. A negative electrode for a lithium secondary battery, the electrode comprising:
a current collector; and
the solid-state ion conductor of claim 1 on the current collector.

13. An electrochemical cell comprising:
a positive electrode;
a negative electrode; and
an electrolyte layer between the positive electrode and the negative electrode,
wherein at least one of the positive electrode, the negative electrode, or the electrolyte layer comprises the solid-state ion conductor of claim 1.

14. A method of preparing the solid-state ion conductor of claim 1, the method comprising:
contacting
a lithium compound,
a compound comprising an element having an oxidation state a of 1≤a≤3 of Groups 1 to 3 or 11 to 13, or a combination thereof,
a compound comprising an element having an oxidation state of +4 of Groups 4 or 14, or a combination thereof, and
a compound comprising an element having an oxidation state of +5 of Groups 15, 17, or a combination thereof to provide a mixture; and
treating the mixture to provide a compound of Formula 1

$$Li_{1+(4-a)y}A^a{}_yM_{1-y}XO_5 \qquad \text{Formula 1}$$

wherein, in Formula 1,
A is an element of Groups 1 to 3 or 11 to 13, or a combination thereof, wherein an oxidation state a of A is 1≤a≤3,
M is an element having an oxidation state of +4 of Groups 4, 14, or a combination thereof,
X is an element having an oxidation state of +5 of Groups 15, 17, or a combination thereof, and
0<y≤1.

15. The method of claim 14, wherein the treating comprises ball milling at least 450 RPM or heat treating at 700° C. or less.

* * * * *